March 29, 1960

L. J. ST. CLAIR 2,930,111

TOOL HOLDER

Filed Feb. 26, 1954

INVENTOR
Leo J. St. Clair

BY Stevens, Davis, Miller & Mosher
ATTORNEYS

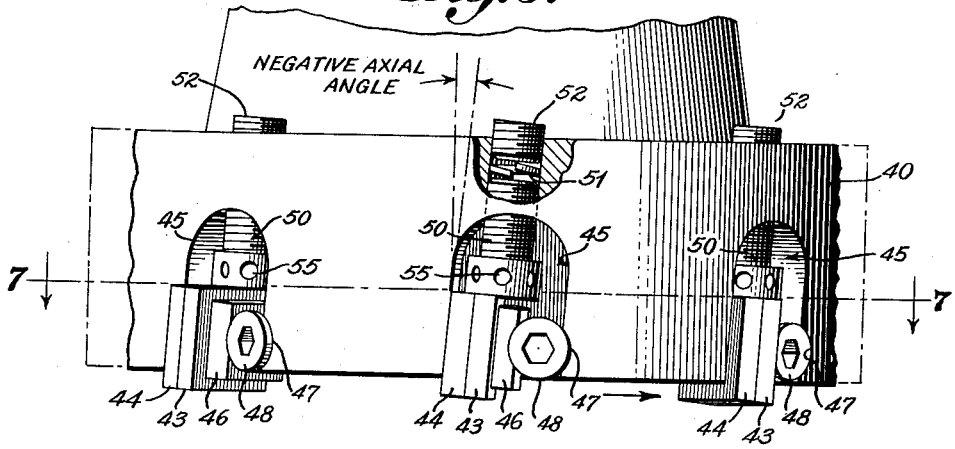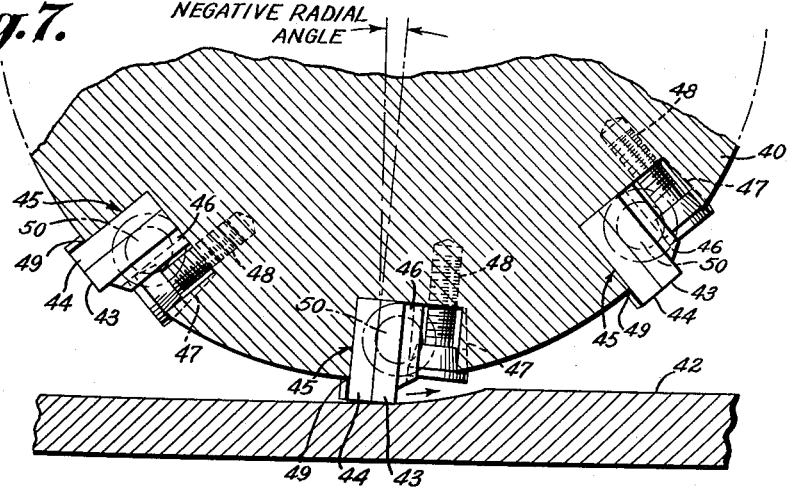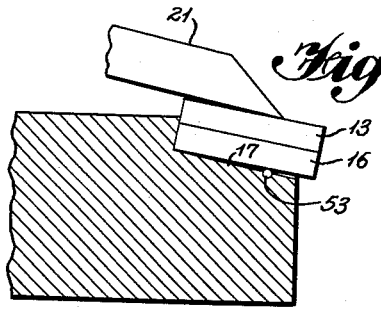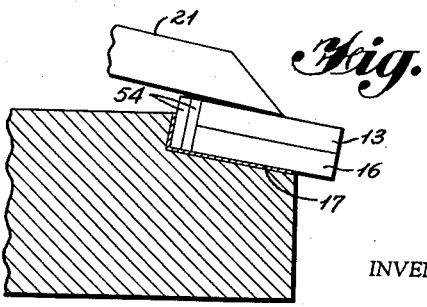
INVENTOR
Leo J. St. Clair

2,930,111

TOOL HOLDER

Leo J. St. Clair, East Orange, N.J., assignor, by mesne assignments, to Adamas Carbide Corporation, Kenilworth, N.J., a corporation of New York Application February 26, 1954, Serial No. 412,810

7 Claims. (Cl. 29—96)

This invention relates to cutting tools useful in such machining operations as milling, planing, boring, shaping, turning and the like. In particular this invention relates to a combination of cutting element and tool holder that permits greater metal removal rates with far less tool cost and far less damage to and breakage of cutting tools.

Prior to this invention harder and harder cutting materials were developed and the ability of these materials to resist softening at high temperatures was also developed until a place was finally reached where cutting tools could be produced that operated at a red heat without softening and could operate for hours without dulling. However, if these cutting tools are subjected to cutting loads sufficient to test their capabilities in these respects the tools are also subjected to shocks incidental to rough or hard spots in the material being machined and to unevenness of the pieces being machined during first roughing cuts and the like, and these things tend to break the new cutting materials, which for all their hardness and heat resisting ability, are nevertheless quite brittle. Numerous attempts have been made to avoid this breakage due to the brittleness of such cutting tools, but until the present, these attempts have met with little success.

The usual approach to the problem has been to build a tool holder with resilience in some manner built into the shank of the tool holder to relieve the shock stresses placed upon the cutting edge. In all such purported "shock absorbing" tools, the cutting element embodying the cutting edge is held rigidly and tool shank or body is provided with some sort of resilience or spring action. A shock or blow that will sufficiently deflect the tool shank in such a tool has to be met by the rigidly held cutting element. Damage to the cutting edge is usually done before the tool shank reacts to the shock. Results with such tools have not been satisfactory. Such tools continued to break and in many cases a part of the broken tool edge embeds itself in the work being machined making it difficult even to salvage the part being machined. Furthermore, each tool breakage or dulling often requires complete removal of the tool shank and the installation of a new tool shank and the consequent adjustment of the new tool to the proper finish machining dimensions.

Briefly, the present invention contemplates the use of a cutting element of a hard but relatively brittle material together with a supporting plate adapted to underlie and support the cutting element substantially all the way to its cutting edge. This supporting plate is a rigid material but softer and less brittle than the material of the cutting element. The cutting element and the supporting plate are held in a pocket or shelf formed in a rigid tool holder. The pocket or shelf is shaped to underlie and support the supporting plate to a point a prescribed distance back of the cutting edge of the cutting element. A clamping member is then provided which is arranged to overlie the cutting element and the supporting plate and lock them in position in the tool holder. The clamping plate is usually tilted to bear against the cutting element at a point more or less in line with the point at which the cutting element and supporting plate are supported from below. This means that while the clamping plate is pressing down upon the cutting element the tendency is for the cutting element to remain firmly in the pocket in the holder but free to move when shock forces are met. Therefore when the cutting edge of the cutting element encounters a rough place in the work that is being machined, the arrangement is such that the cutting element and the supporting plate can tilt or "give" slightly to smooth out the impact load enough so that instead of having a sudden peak impact load, this impact load is flattened out over a short period of time and thus very greatly decreased in its maximum magnitude. This is the first time in cutting tool history where the cutting element is purposely made non-rigid and the tool holder or shank essentially rigid.

A small amount of resilience is necessary to allow the slight tilting of the cutting element and supporting plate, and this is provided in two ways. First, a bolt which attaches the clamping member to the holder is so arranged that a considerable length of the bolt is between the place where the bolt bears against the clamping member and the place where the bolt is attached to the holder. Thus, there is a sufficient length of the bolt body under tension so that this bolt can elongate slightly and thus permit a slight rocking motion of the cutting element and support plate. In addition, the clamping member is so mounted that it tilts at a slight angle to the upper surface of the cutting element. Thus, it bears against the cutting element at its forward edge thereby providing a slight gap between the rear surface of the cutting element and the bottom of the clamp surface. This permits the cutting element and supporting plate to tilt somewhat with only slight movement or slight flexing of the clamping member.

The cutting element itself is preferably then in a shape of a square flat plate with the edges perpendicular to the flat sides of the plate so that a cutting edge is formed at each of the four top corners of the plate and then, by inverting the plate, at each of the four bottom corners of the plate. A rectangular, triangular, parallelogram or round cutting element (with supporting plate of the same shape and dimension) may be used both top and bottom. A rectangular and a parallelogram type cutting element has a total of four usable cutting edges, a triangular one, six, and the round one, an infinite number since it can be rotated 360° while constantly presenting new cutting edges. The use of a cutting element of such shape is made possible by mounting the cutting element assembly so that it has both a negative side rake and a negative back rake. This also permits the supporting plate to extend right out to the edge of the cutting element so that it can support the cutting element all the way to the cutting edge. The pocket into which the supporting plate and cutting element fit may then be shaped so that the cutting element may be indexed and inverted to any of its several cutting positions and still fit into the pocket and be positioned exactly with respect to the work by the pocket.

The supporting plate is preferably provided with a covering of copper or some other soft metal so that the cutting element will seat tightly upon it (since the irregularities on the cutting element surface are pressed into the soft plate on the supporting plate by the clamping pressure applied to the cutting element) and good heat conduction away from the cutting edge will be provided.

The principles of this invention may be applied either to a cutting element and holder of the type generally used in a lathe, shaper, or planer or other machine tool of this general type, or to the type of tool that is generally used in a milling machine or drill press. Moreover this type of resilient tool can be well adapted to broaching operations. In the milling machine, the tool holder rotates and, hence, we have a milling cutter type of tool.

No attempt will be made herein to illustrate all of the possible variations to which the principles of this invention are subject, but for purposes of illustration the application of the principles of this invention to the construction of a lathe tool and tool holder, and to the construction of a milling cutter, will be illustrated and described. The same type of tool holder that is used in a lathe may be used in a shaper or planer or boring mill, and the same type of a cutter that is used in a milling machine may be used in a drill press and other similar machine tool arrangement.

In the drawings:

Figure 6 is an elevational view of a part of a milling cutter and a piece of work being milled by the milling cutter, parts of the milling cutter and the work being cut away to illustrate the action of the cutter;

Figure 7 is a bottom view of the same milling cutter;

Figure 8 is a side view similar to Figure 3 except that pivot point of cutting tool assembly is inside of tool holder pocket edge; and Figure 9 is a detailed view in section showing the manner in which spacing blocks may be used to space the cutting element and the supporting plate in the pocket of a tool holder.

As illustrated in Figures 1 to 4, the principles of this invention have been applied to the construction of a cutting element and tool holder for use in a vertical turret lathe. Such lathes are used for example, for the rough machining of roller bearings for railroad car journal boxes. In one particular instance, the cutting element and tool holder of this invention were used in a Bullard vertical turret lathe to machine roller bearings for railroad car journal boxes out of SAE 4320 bearing steel, eleven inches long, and eight and one-quarter inches finished outside diameter. In this operation these tools were called upon to remove about three-eighths inch of steel from the rough outside diameter. The illustration of Figures 1 to 4 was taken directly from this operation.

Figure 1:
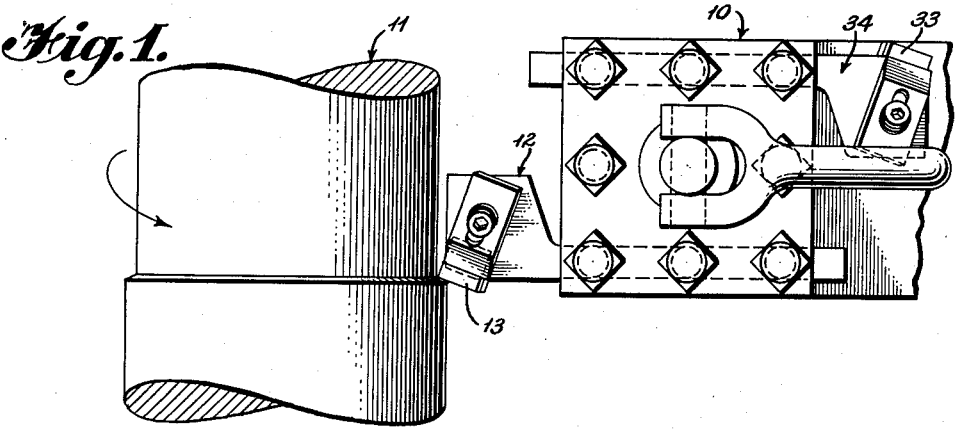
Figure 1 is an elevational view showing a part of a vertical turret lathe and a part of a piece of work being machined thereby and with the cutting element and tool holder of this invention in position in the turret of the lathe.
Figure 5:
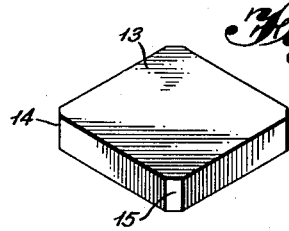
Figure 5 is a perspective view of a cutting element for use in the tool holder of preceding figures.

As illustrated in Figure 1 a turret 10 on a turret lathe, which is not shown, holds the tool holder of this invention and moves vertically along a piece of work 11 which is rotated by the lathe. This causes the cutting element held in the tool holder to cut the work 11 to the desired size. The tool holder of this invention, which is generally designated as 12, carries a cutting element 13 which performs the actual cutting operation. The cutting element 13 is shown in detail in Figure 5. As can be seen in that figure, the cutting element 13 is generally square in shape and has two flat sides and the edges are perpendicular to the sides. Each of the corners are sometimes cut off at a 45 degree angle to the side edges as shown at 14 and 15. By utilizing a negative back rake and a negative side rake, it is possible to use all four corners on the top surface and all four corners on the bottom surface of the cutting element 13 to provide a total of eight cutting edges. This cutting element may be of any shape according to the work to be done. For instance, it may be rectangular, diamond-shaped, triangular, round, etc.

Figure 2:
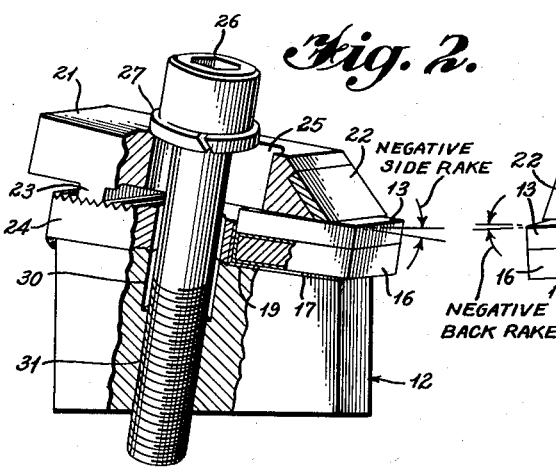
Figure 2 is an end view of the cutting element assembly and tool holder of this invention with parts cut away to show the construction of the tool holder.
Figure 3:
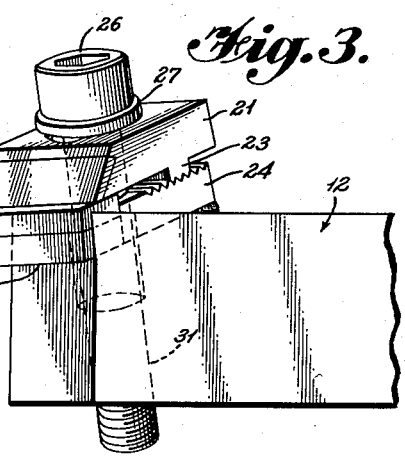
Figure 3 is a side view of the same cutting element assembly and tool holder.
Figure 4:
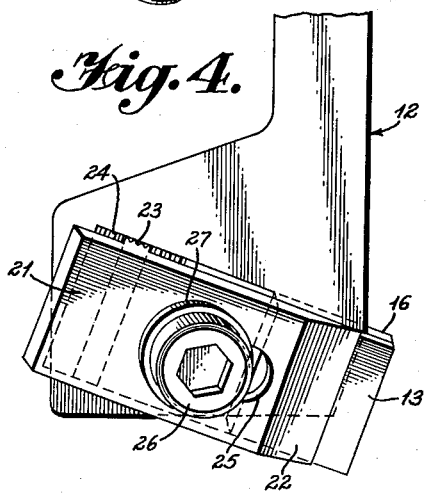
Figure 4 is a top view of a part of the same tool holder.

The cutting element 13 rests upon a supporting plate 16, as shown in Figures 2, 3 and 4, and the supporting plate 16 rests in turn in a pocket or shelf 17 formed in the tool holder 12. During the normal cutting operation the cutting element 13 and the supporting plate 16 are seated firmly in the pocket 17 of the tool holder 12 and extend over the edge of this tool holder a predetermined distance. This distance while not extremely critical must be sufficient so that shock loads on the edge of the cutting element will cause a slight tilting action. It has been found that to get sufficient movement of the cutting assembly (13 and 16), the cutting edge should project a distance of at least 15% of the width of the cutting element 13 in the case of a side cutting tool and 15% of the length of the cutting element in the case of an end cutting tool. This projection or overhang is in the direction of feed or in the direction of the carriage travel. Much experimentation has shown that very efficient operation is secured when this overhang is about 25% of the width or length of the cutting element 13. Very poor results are secured with the overhang less than 15% in that excessive breakage of the cutting element 13 takes place because of its inability to be actuated around the pivot point at the edge of the tool holder pocket.

The supporting plate 16 is preferably covered by a coating of copper or some other soft metal 18. This helps the cutting element to seat itself solidly on the supporting plate 16 because the clamping pressure forces the surface irregularities on bottom surface of cutting element 13 into the plating 18 on supporting plate 16. The copper plate also assists in conducting heat away from the cutting element. Moreover, the copper plate increases the coefficient of friction between the cutting element 13 and the supporting plate 16, making it less possible to have the cutting element 13 shift while in use. The copper plate also provides a "cushioning" action that helps the cutting edge to better absorb shock. A coating of copper or other soft metal 19 may also line the pocket 17 of the tool holder 12 for the same purpose. This soft coating may also be applied to the bottom of clamp 21, so that cutting element 13 is then held between two plated surfaces, all tending to soften impact blows against the cutting edge of cutting element 13.

The cutting element 13 and the supporting plate 16 are held in position in the pocket 17 by a clamping member 21, the details of which are shown in Figures 2, 3 and 4. This clamping member is tapered toward the edge of the cutting element, and may be provided along its tapered edge with a hard protecting surface 22 which enables it to act as a chip breaker without being cut away by the metal chip which is often directed against it. The tapered or angular face on the clamp 21 may also be faced with hard chrome to increase its wear resistance quality. The rear end of clamping plate or member 21 is provided with a shoulder 23 having serrations cut into its undersurface. The tool holder 12 has welded to it a backing plate 24 having on its upper surface serrations matching to those of the shoulder 23. By this means the clamping member 21 is positioned away from the tool holder 12 and hence contacts the cutting element 13 on a line as will be evident from the drawings. If desired the rear end of the clamping plate 21 can be adjustable as to position by means of a set screw which is threaded through it and bears at its lower end in a point contact between the serrations on backing plate 24 or if desired on serrations on the tool holder 12. The clamping member 21 is also provided with an elongated slot 25 intermediate its ends and a cap screw 26 passes through a lock washer 27 and then through this slot and into and through the holder 12 to press the clamping member 21 down onto the cutting element 13. The elongated slot 25 is to provide clamp adjustment for chip breaking purposes. With light feeds per revolution while machining, the chip breaker face 22 is brought quite close to the cutting edge of cutting element 13, while for heavy feeds the breaker face is adjusted further away from the cutting edge of cutting element 13.

As can be seen from Figure 2, the clamping member 21 is tilted so that it generally presses against the cutting element 13 only along its forward edge, that is, the edge nearest the cutting edge of the cutting element 13. On finishing cuts where the feed per revolution is light, the forward edge of clamp 21 is often outside the holder pivot edge and the cutting element (13) surface parallels the bottom of clamp 21. Movement of the cutting element assembly (13 and 16) is then provided by the "give" in body of bolt 26. On the heavier roughing cuts, the forward edge of the clamping member 21 is either in line with or slightly back of the supporting edge of the holder 12 which extends under the supporting plate 16. Thus, downward pressure of the clamping member 21 tends to hold the cutting element 13 and the supporting plate 16 firmly in the pocket 17, but shock loads cause these two members to tilt slightly around pivot point formed by tool holder support edge.

The clamping member 21 has some slight resiliency and the cap screw 26 also has some resiliency. To provide resiliency, the cap screw 26 passes downwardly into an opening 30 in the holder 12, which opening is slightly larger in diameter than the cap screw. This opening extends deep enough into the holder 12 so that there is an appreciable length of cap screw 26 between the head and the lower end, at which the cap screw is threaded into the holder 12 as indicated at 31 in Figure 2.

The holder 12 is mounted in the turret head 10 in the usual manner and a similar tool 33 and tool holder 34 can be mounted in the opposite position in this same turret head. When the tool becomes dull, or is broken, the turret head is simply rotated to bring the other cutting element and tool holder into position and with the machine continuing to operate the cutting element 13 of the worn or broken tool is loosened in the tool holder and indexed to a new position. Eight new cutting edges can thus be presented before it becomes necessary to change cutting elements. Furthermore, the cutting elements, by reason of their simple geometric configuration, are extremely easy to grind and prepare for use.

When desired a small valley or groove may be ground into the cutting element 13 just behind the cutting edge so as to change the effective angle of side rake and make it less negative, neutral, or positive. This is often necessary for machining materials such as soft steel, aluminum, titanium, etc.

Passing now to Figures 6 and 7, we find illustrated therein a milling cutter constructed in accordance with the principles of this invention. However, since the principles of operation of milling machines, and milling machines themselves, are quite old, no attempt has been made to illustrate a milling machine or even a complete milling cutter.

As illustrated in Figure 6, there can be seen part of a milling cutter 40 which is circular and of course rotates upon a spindle not shown but centered at point 41. This milling cutter is operated to cut a flat piece of work 42 which is shown in section in Figure 6.

Mounted in the milling cutter, as shown, are a series of cutting elements 43. These cutting elements are similar to those shown as 13 in Figures 1 to 5, specifically in Figure 5. Underlying each of these cutting elements 43 is a supporting plate 44 which is again similar to the supporting plate 16 shown in Figures 1 to 4. Each cutting element 43 and support plate 44 is mounted in a pocket 45 formed in the periphery of the milling cutter 40 as illustrated in Figures 6 and 7, Figure 7 being a side view and Figure 6 a bottom view of the milling cutter. Again, as in the previous figures, the cutting element 43 and supporting plate 44 extend out of the holder which in this case is a milling cutter 40, a distance sufficient to provide a slight rocking action when impact loads are placed upon the cutting edge of the cutting element 43.

Each cutting element 43 and support plate 44 may be held in place in a number of different ways. One way of doing this is shown in Figures 6 and 7. A top plate 46 has a circular groove to accommodate the circular tapered head of holding screw 48. The tapered screw 48 contacts pockets 45 formed in the milling cutter 40 which receives the cutting element 43 and the supporting plate 44. Pocket 45 has a tapered circular groove 47 which rests against the tapered head of the holding screw 48. When holding screw 48 is tightened into body 40, the tapered head of this screw exerts a downward clamping pressure on top plate 46 which in turn locks cutting element 43 and supporting plate 44 in position. The tapered head of holding screw 48 creates a downward pressure on the cutting element 43 at a point slightly inside the point of pocket support point 49. This allows cutting element 43, support plate 44 and top plate 46 to pivot around point 49 and thereby providing a rocking movement for the cutting element 43 when shock or impact forces are met. This rocking movement causes the high shock loads to be spread out in point of time enough to very greatly reduce maximum load at any instant of time.

The upper edge of cutting element 43 impinges on the head of backing screw 50. This screw has a head through which has been drilled a series of six holes 55 as shown in Figure 7. These holes make it possible to adjust the cutting element 43 downward by inserting a rod into said holes and rotating backing screw 50. This arrangement provides a micrometer adjustment on all the cutting elements 43 in the cutter head. By the use of a strong light back of the bottom edge of the cutting element 43, it is possible to adjust each cutting element to a milled surface so that all bottom faces on the cutting elements 43 tract perfectly over the milled surface. This makes possible the highest degree of finish ever achieved with a milling cutter. Finished surfaces as smooth as 5 to 10 micro-inch have been made with this type cutter. It is believed that this is the only milling cutter at present that has provision to adjust the bottom faces of all cutting elements so that they can produce a very smooth surface—so smooth that ground finishes are not necessary.

To keep backing screws 50 in constant position a tension screw 52 is tightened against a heavy duty lock washer 51. Lock washer 51 is used to maintain a tension so that the threads of screws 50 and 52 are kept always in the same contact positions against their respective threads.

When it is desired to use a cutting element and supporting plate that are smaller than standard, spacing plates 54 may be placed behind or along side of either the cutting element or the supporting plate or both, as may be necessary. This is shown in Figure 9. In some instances it will be found necessary or desirable to use a rectangular cutting element instead of a square cutting element, and in such cases the spacing plates may be necessary only in some of the positions in which the cutting elements may be inserted in the holder. Although not shown in Figures 6 and 7, a copper or soft metal coating is preferably used upon the supporting plate 44 and the top plate 46 or on clamps used on tool shown in Figure 8 and in all of the tool and tool holder combinations made in accordance with the principles of this invention. Similarly, the forward sloping edge of top plate 46 may be covered by a hard metal plate such as hard chrome so that it will not be abraded readily by the chips formed when milling.

Figure 8 shows a possible modification of the cutting element assembly as shown in Figure 2. Here the cutting element 13 and supporting plate 16 do not extend appreciably beyond the edge of the pocket formed in the tool holder. The cutting element assembly can be rocked around pivot 53 to get substantially the same effect as that shown in Figure 2.

Numerous minor modifications in the construction of tools and tool holders in accordance with the principles of this invention may obviously be made. These are considered to be within the scope of this invention and of the appended claims.

Two of the most important advantages that this tool holder has over any others designed to date are:

(1) It allows the use of much harder cutting elements than has previously been used on equivalent machining operations. The non-rigid cutting element assembly has such shock absorbing properties that the hardest cutting tool materials can successfully be used on the toughest machining job. This ability to use far harder cutting tool materials than heretofore provides the novel character of this invention and provides a definite and important step forward in the machining of all metals. The possible use of harder cutting tool materials allows this tool to operate at higher metal removal rates than ever before possible and still have good tool life.

(2) Since the cutting edge of this tool overhangs the tool holder a considerable degree or amount or distance, it is possible for the cutting element to broken and still have no injury to the tool holder. All present tool holders outside of this one are severely damaged when the cutting element breaks while taking deep cuts since the cutting edge overhang is necessarily very little and the tool holder body rubs against the cut shoulder of the piece being machined once the cutting element is broken. This rubbing erodes the tool holder and often ruins it beyond further use. The design principles used to construct the tool holder described in this application is novel and a distinct step forward in the use of cutting tools that are not susceptible to damage due to breakage of the cutting element.

Although the present invention has been shown and described with respect to specific embodiments, nevertheless various changes and modifications obvious to a man skilled in the art are within the spirit, scope and contemplation of the present invention.

What is claimed is:

1. In combination, a tool holder having an open face with a straight edge forming a fulcrum line, a support means seated on said tool holder and having one end overhanging said fulcrum line, a bit carried by said support means and having a cutting edge adjacent said one end of said support means, and a clamp having a line contact with said bit, said line contact and fulcrum line being parallel and lying in closely adjacent planes between said cutting edge and the mid point of said bit, whereby limited rocking of said bit and support means about said fulcrum line is permitted under shock loads.

2. The structure of claim 1 wherein said line contact is between said fulcrum line and said midpoint.

3. The structure of claim 1 wherein said bit is comprised of hard but relatively brittle material and said support means comprises a plate surfaced with soft metal.

4. The structure of claim 1, wherein means are provided for retaining said clamp in an inclinded position relative to said bit, the clamp being provided with an aperture, said means comprising a stud passing through said aperture and having a lower screw threaded end screwed to said holder and a head at the upper end of the stud located above said clamping member, a lock washer interposed between the head and said clamping member, said holder being formed with a bore, presenting a clearance between said holder and said stud, above the screw threaded connection between said stud and holder.

5. The combination of claim 1, the distance which one end of said bit overhangs said fulcrum line being 15 to 25% of the length dimension of the supporting face as taken in the direction of feed.

6. In combination, a tool holder having an open face having means including a portion providing a straight fulcrum, a support means seated on the face of said tool holder and having one end overhanging said fulcrum, a bit carried by said support means and having a cutting edge adjacent said one end of said support means, and a clamp having means contacting with said bit and including a line of contact about which said support means and bit may rock, said line of contact and fulcrum having parallel portions and lying in closely adjacent parallel planes between said cutting edge and the mid point of said bit, whereby limited rocking of said bit and support means about said fulcrum is permitted under shock loads.

7. The combination of claim 6, wherein said fulcrum is between said line of contact and said midpoint.

References Cited in the file of this patent

UNITED STATES PATENTS

| | | |
|---|---|---|
| 858,440 | Chapman | July 2, 1907 |
| 989,674 | Weiss | Apr. 18, 1911 |
| 1,043,831 | Heinkel et al. | Nov. 12, 1912 |
| 1,397,357 | Bronander | Nov. 15, 1921 |
| 1,459,805 | Tasher | June 26, 1923 |
| 1,736,449 | Lip | Nov. 19, 1929 |
| 1,776,335 | Rauzieres | Sept. 23, 1930 |
| 1,843,549 | Frith | Feb. 2, 1932 |
| 2,181,023 | Moore | Nov. 21, 1939 |
| 2,451,246 | Sheridan | Oct. 12, 1948 |
| 2,452,877 | Sheridan | Nov. 2, 1948 |
| 2,525,216 | Gerrand | Oct. 10, 1950 |
| 2,675,604 | Plummer | Apr. 20, 1954 |
| 2,716,800 | Bader | Sept. 6, 1955 |
| 2,734,256 | Forward | Feb. 14, 1956 |
| 2,808,637 | Hudson | Oct. 8, 1957 |

FOREIGN PATENTS

| | | |
|---|---|---|
| 713,475 | Great Britain | Aug. 17, 1931 |
| 989,306 | France | May 23, 1951 |
| 989,307 | France | May 23, 1951 |